United States Patent
Huff (10) Patent No.: US 9,834,927 B2
(45) Date of Patent: Dec. 5, 2017

(54) FLOOR PROTECTOR

(71) Applicant: INTEGRATED DESIGN LIMITED, Feltham, Middlesex (GB)

(72) Inventor: Derek Huff, Claygate (GB)

(73) Assignee: INTEGRATED DESIGN LIMITED, Felthan, Middlesex (GB)

( * ) Notice: Subject to any disclaimer, the term of this patent is extended or adjusted under 35 U.S.C. 154(b) by 0 days.

(21) Appl. No.: 15/276,149

(22) Filed: Sep. 26, 2016

(65) Prior Publication Data
US 2017/0089068 A1 Mar. 30, 2017

(30) Foreign Application Priority Data
Sep. 28, 2015 (GB) .................................. 1517073.1

(51) Int. Cl.
| | |
|---|---|
| E04B 5/48 | (2006.01) |
| E04F 15/02 | (2006.01) |
| E04F 19/06 | (2006.01) |
| E06B 1/70 | (2006.01) |
| H02G 3/38 | (2006.01) |

(52) U.S. Cl.
CPC .......... *E04B 5/48* (2013.01); *E04F 15/02005* (2013.01); *E04F 19/062* (2013.01); *E04F 19/065* (2013.01); *E06B 1/70* (2013.01); *H02G 3/283* (2013.01); *H02G 3/285* (2013.01); *H02G 3/383* (2013.01); *H02G 3/385* (2013.01)

(58) Field of Classification Search
CPC ........ H02G 3/383; H02G 3/385; H02G 3/283; H02G 3/285; H02G 3/34; E06B 11/08; E04B 5/48; E04F 15/02005; E04F 19/062; E04F 19/065; G07B 15/00

USPC .................................................. 174/97, 99 R
See application file for complete search history.

(56) References Cited

U.S. PATENT DOCUMENTS

| | | | |
|---|---|---|---|
| 5,095,822 A | 3/1992 | Martin | |
| 5,777,266 A * | 7/1998 | Herman | H02G 9/02 138/155 |
| 6,202,565 B1 * | 3/2001 | Henry | A62C 33/06 104/275 |
| 6,367,211 B1 * | 4/2002 | Weener | H02G 3/383 138/120 |

(Continued)

FOREIGN PATENT DOCUMENTS

JP H07152931 6/1995

OTHER PUBLICATIONS

Search Report—Corresponding European Application No. 16189955.4, dated Nov. 15, 2016, 7 pages.

*Primary Examiner* — Adriana Figueroa
(74) *Attorney, Agent, or Firm* — Leber IP Law; Celia H. Leber (57) ABSTRACT

A floor protector for a security access system, comprising a rigid floor assembly having front and rear edges, the floor assembly comprising at least one floor plate and a base mounted underneath the floor plate, the base being at least partially spaced from the floor plate enabling cabling to pass between the two, and elastomeric entry and exit ramps supporting the front and rear edges of the floor assembly; wherein the base has protrusions at its front and rear edges which locate within respective grooves in respective elastomeric ramps, spaced a distance above the lower surface of the ramp, so as to support the base spaced above the whole or a major part of the floor that it overlies.

17 Claims, 5 Drawing Sheets

(56) References Cited

U.S. PATENT DOCUMENTS

| | | | | |
|---|---|---|---|---|
| 6,523,986 B1* | 2/2003 | Hoffmann | E04F 19/02 | 362/153 |
| 6,747,212 B1* | 6/2004 | Henry | H02G 3/283 | 104/275 |
| 6,878,881 B1* | 4/2005 | Henry | H02G 9/04 | 104/275 |
| 7,145,079 B1* | 12/2006 | Henry | H02G 3/0418 | 104/275 |
| 7,309,836 B2* | 12/2007 | Lubanski | H02G 3/0418 | 104/275 |
| 7,939,759 B2* | 5/2011 | Henry | H02G 3/0406 | 174/101 |
| 7,943,851 B2* | 5/2011 | Lubanski | F16L 57/00 | 138/155 |
| 8,001,643 B1* | 8/2011 | James | F16L 3/23 | 14/69.5 |
| 8,288,652 B2* | 10/2012 | Lubanski | H02G 9/025 | 104/275 |
| 9,438,022 B2* | 9/2016 | Lioi | H02G 3/34 | |
| 2009/0020305 A1* | 1/2009 | Fidler | H01R 13/5219 | 174/50 |
| 2009/0260846 A1 | 10/2009 | Henry | | |
| 2014/0020927 A1* | 1/2014 | Coffman | H02G 3/34 | 174/97 |
| 2015/0214704 A1 | 7/2015 | Lioi | | |

\* cited by examiner

FLOOR PROTECTOR

This invention relates to a floor protector. In particular, it relates to a floor protector for protecting the floor under the lanes of an access control system, and for use in situations when it is undesirable to drill into a floor or otherwise damage the floor or provide cable containment under a floor.

It is often required to control and monitor the passage of persons into and out of a controlled area, for example the passage of staff or customers into an office building. One type of product used for this is often referred to as a gate, turnstile or speedgate. Typically these will consist of one or more enclosures which channel movement of people into a monitored path and some means is provided to monitor or count this passage by some electronic, optical or mechanical means, and also to control or deter passage e.g. moving gates and barriers. In addition, there may be fitted to or associated with these products, a means of verifying authorisation. In a corporate foyer for example, these enclosures need to be fixed in place so that they do not move, typically this will be done with some form of floor fixing. Often cables from associated electronic components need to run out of and between these enclosures; this will typically involve drilling or routing the floor material. However, in some situations, interfering with the floor is not desirable for commercial, practical or other reasons.

It is also important that any floor protector assembly be low profile and easy to traverse by a variety of users, such as pedestrians, wheelchair users, and so on.

According to the present invention there is provided a floor protector comprising in a floor protector for a security access system, comprising a rigid floor assembly having front and rear edges, the floor assembly comprising at least one floor plate and a base mounted underneath the floor plate, the base being at least partially spaced from the floor plate enabling cabling to pass between the two, and elastomeric entry and exit ramps supporting the front and rear edges of the floor assembly; wherein the base has protrusions at its front and rear edges which locate within respective grooves in respective elastomeric ramps, spaced a distance above the lower surface of the ramp, so as to support the base spaced above the whole or a major part of the floor that it overlies.

The floor plate means and base may be of rigid materials such as a metal material or rigid plastics material, whereas the ramps may be made of elastomeric materials such as rubber or a rubber compound of other elastomeric material which are sufficiently strong to withstand the passage of persons.

Preferably, each ramp comprises a narrow end and a wider end and a groove at the wider end extending inwardly into the ramp and having a generally "S" shape, or dog-leg cross-section, and the base member comprises an outward protrusion having a corresponding shape for fitting within the groove. Thus, when the base part lies on a flat surface, since the groove is positioned a distance above the base of the ramp, the base member sits, above the floor or at least with its major part above the floor (assuming the floor is flat).

At least one of the ramps may have an arcuate base which curves downwardly in a rest state. It may have a radius of curvature of 1 m or 1.5 m for example. The curvature has the effect that when the ramp is positioned on a flat floor, it is stressed, since the curve part must bend upwards to form a flat line and, therefore, the ramp is less likely to buckle with use, which might cause the distal end thereof to rise from the floor and represent a possible danger and also enables the ramp to more securely and efficiently fit upon a floor which may not be perfectly flat.

The base may be generally castellated to form reinforcing ribs in a transverse direction (transverse to the direction of passage of a person) and is connected to the floor plate by means of one or more deep channel elongate members mounted within each rib and secured by a means such as a long spring channel nut. A long spring channel nut is sometimes referred as a zebedee. This joints the floor plate, base member and deep channel elongate member at the ridge.

Most preferably, the ribs formed by the castellation include lateral orifices for entry/exit and which are inwardly facing (i.e. one orifice faces the other) and these are most preferably transversely off-set from one another such that cables may pass between the two.

The off-set nature increases strength and stability since it means that weakened points are not all formed in a single line across the structure.

In order to further to accommodate for an uneven floor, the base may be provided with one or more through-holes and at least one jacking screw is inserted through at least one of the holes and used to adjust the height of the base above the floor. The hole may be threaded and the jacking screw correspondingly threaded for example, so that as the jacking screw is screwed into the hole, it raises the level of the base relative to the ground. The jacking screw is preferably of nylon or a similar plastics or other material which is substantially non-damaging to a floor.

Embodiments of the invention will now be described, by way of example only, with reference to the accompanying schematic drawings in which.

Figure 1:
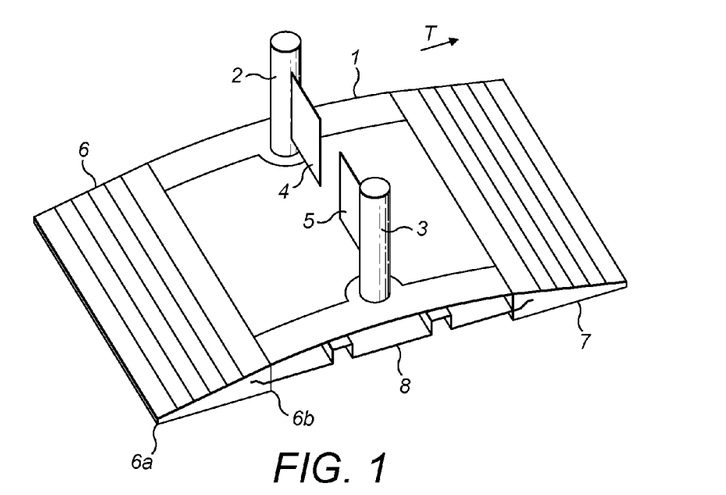
FIG. 1 shows a floor protector assembly.

FIG. 1 shows a floor protector assembly for an access control device. The device shows schematically, a completed assembly comprising a metal or other rigid floor 1 means (formed in one or a plurality of pieces) upon which is mounted housings 2, 3, 4 of an access control apparatus which include pivoting gates 4 and 5 for example. It may also include a card reader or other access authorisation means and perhaps also means for receiving and transmitting infrared beams for monitoring passage in the traversing direction T. To the front and back of floor 1 is mounted entry ramps 6 and 7, each of which have a narrow end 6a and a wider end 6b. In one embodiment end 6a might be 8 mm high, which enables a person with a wheelchair to relatively easily mount the ramps. The ramps 6 and 7 are formed of an elastomeric material, typically a rubber material or rubber compound material which is hardwearing and resilient.

Figure 2:
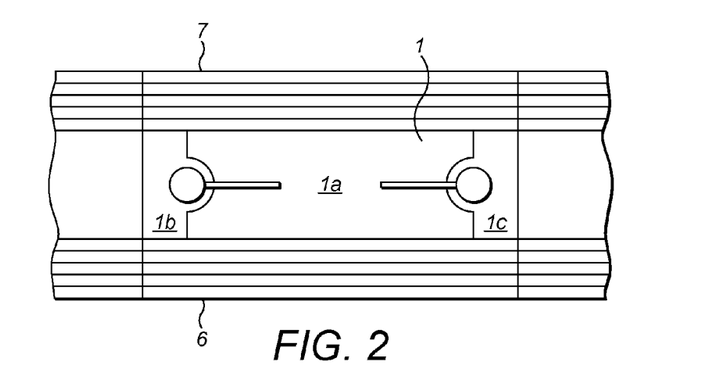
FIG. 2 shows a top view of the assembly.

FIG. 2 shows a plan view. The floor mean comprises a floor plate 1 mounted on top of a base member 8 which includes transversely mounted reinforcing ribs 10 and 11 as are further described below. Mounting means may be provided within this to connect the plates together, as will also be described below.

As shown in FIG. 2, the floor plate 1 includes a central part 1a and two side parts 1b, 1c upon which the housings 2, 3 are mounted. These parts are abutted together. This enables the central plate 1a to be removed whilst the housings are still in position for cabling to be maintained, replaced and so on, which cabling is mounted between floor 1 and base member 8. The parts 1a, 1b and 1c form a substantially flat floor means in use.

Figure 3:
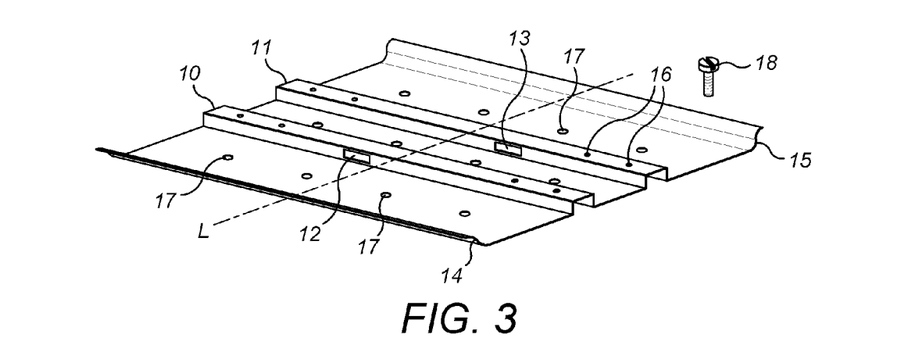
FIG. 3 shows a base member.

As shown in FIG. 3, the base floor includes transverse reinforcing ribs 10, 11 extending the width of the base plate and these are preferably formed by forming the plate in a castellated structure. Cabling for the access control apparatus maybe mounted between the floor 1 and the pre-existing floor upon which the device sits, (eg within the space between the floor plates and the floor) and also within the reinforcing ribs 10, 11. This is particularly convenient because the apparatus may be formed in a modular structure in which a number of lanes are provided side by side so that cabling can be taken along the ribbed portion for a plurality of access control apparatus in different lanes. In order for cabling to enter and exit the ribs, holes or openings 12, 13 are provided in the ribs enabling the entry or exit of said cables. These may be provided on one or both sides of the ribs i.e. the leading and trailing edges in direction T of FIG. 1 and are most preferably transversely off-set from one another (ie in the example shown they lie on opposite sides of the longitudinal centre line 4, and as shown in FIG. 3, hole or orifice 12 is provided more leftwards than hole 13). This is particularly advantageous as it means that cabling will not get bunched up and also it provides for much greater strength since if all the holes were provided in line, the base plate might be relatively weak in that line so that if a person stood on that part, it might be more liable to break. By off-setting the cable exit/entry holes, this problem is avoided in a unique way. Note that more than one hole may be provided in each rib.

At the front and rear edges of the base plate are formed connecting elongate protrusions in the form of elongate lips 14 and 15 which preferably extend over the whole end and are generally "S" shaped in cross-section. These serve to connect or mount the base plate to the ramps. The lips and indeed the material of the base plate, should in general be sufficiently strong that when the lips are mounted in corresponding shaped grooves in the ramp members which are spaced a distance from the bottom surface of the ramp members, the entire base plate, with the floor and the access control apparatus mounted upon it, is substantially supported by the ramps themselves and, therefore, is spaced from at least the major part of the floor upon which it is mounted (assuming the floor is generally flat). See FIG. 6 and the gap between the bottom of the base and the dot-dash line joining the bottom inner ridges of the ramps.

The lips may be other shapes.

The plate as shown in FIG. 3 also includes a number of holes 16 for mounting the access control equipment to suitable attachments and also a further plurality of holes 17 which may, in some embodiments or circumstances, receive a jacking screw 18. The jacking screw 18 may be of nylon or similar plastics or other material which is substantially non-damaging to a floor surface and this may be screw-threaded, acting with a co-operating screw in hole 17, (or self-tapping) such that as the jacking screw is screwed into the hole, acts against the floor surface and tends to push the base up. Thus, jacking screws can be used for raising the bottom surface 19 of the base plate further above a floor or for accommodating uneven floors for example. The jacking screws may alternatively form the holes 17 themselves.

Figure 4:
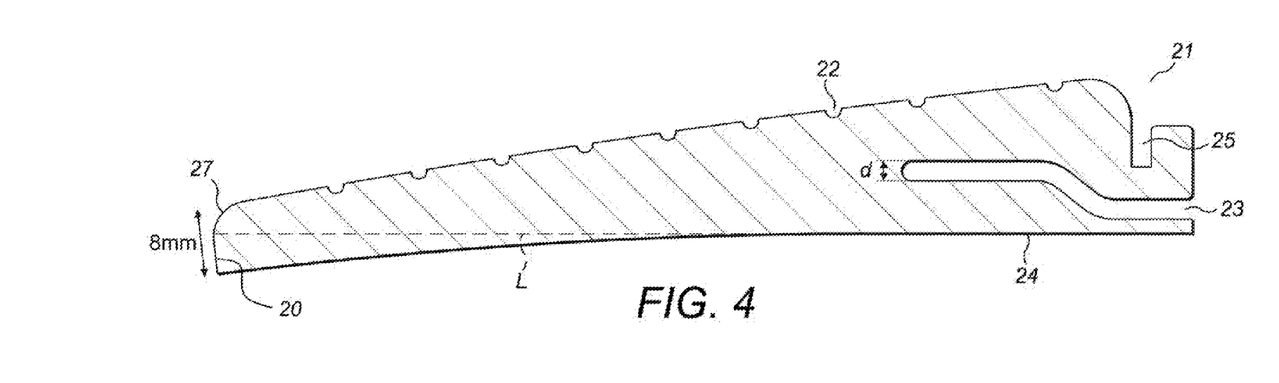
FIG. 4 shows a cross section through ramp.

FIG. 4 shows a cross section through one of the ramps 6. As shown, this includes a narrow end 20 which typically is about 8 mm high and wider end 21. A number of shallow grooves 22 are provided transversely in the top surface of the ramp to provide good grip (and water dispersion) for a person walking over it. The ramp will be typically made of a rubber or other hardwearing elastomeric, resilient and strong material. At its wide end, 21, there is provided an inwardly directed relatively deep groove 23 which is of generally "S" shape. This, as shown, has a first part, from the edge 21 which is generally parallel to the bottom surface 24 at that part, a first upward bend in a direction which is generally between 0 and 90 degrees, typically 45 degrees, and a second bend which is again at the same angle, typically to a final portion which is also generally parallel to the bottom surface 24. The depth of the small groove is typically around 2 mm. Note that the entrance to groove 23 is spaced above the bottom surface 24, typically by about 0.5-3 mmm, or 1.5 to 2 mm.

There is a further groove which extend downwardly in a generally perpendicular direction to the bottom surface 24 and is positioned towards large end 21. This can receive a downwardly directed peripheral lip 26 of a floor plates 1a, 1b and/or 1c (see FIG. 6).

Note that although the bottom surface 24 of a ramp may be flat, it is preferred that this is slightly arcuate in its rest state and curves downwardly from ends 21 towards end 27. It may have a straight portion nearer the deeper end 21 and then a curve portion towards shallow end 27. The radius of curvature of the arc is generally small, typically 1 m to 1.5 m. The advantage of this curvature is configuration that it pre-stresses the ramp. Thus, when the ramp is placed upon a flat surface, the curved part is forced into a straight configuration which tends to push the curved end 27 downwards. This, therefore, acts to reduce the risk of the ramp buckling with use and perhaps the distal end 27 raising from the ground, which could represent a tripping or other risk. The dashed line L in the figure represents a continuation of the straight portion and shows the curvature. Instead of being curved, it may also be just formed of two straight portions or of two or more straight (or arcuate) portions at a non-zero angle to each other.

Figure 5:
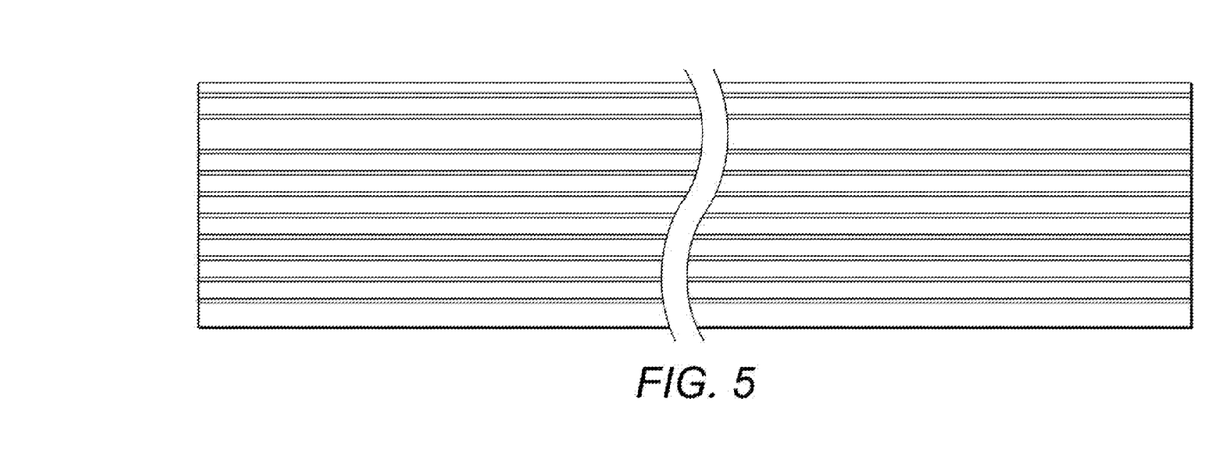
FIG. 5 is a plan view of a ramp.

FIG. 5 shows a plan view of the ramp and shows that this might be of indeterminate width. Thus, where the apparatus is to be used for two or more lanes, a ramp of longer width may be used, or several ramps used side by side.

Figure 6:
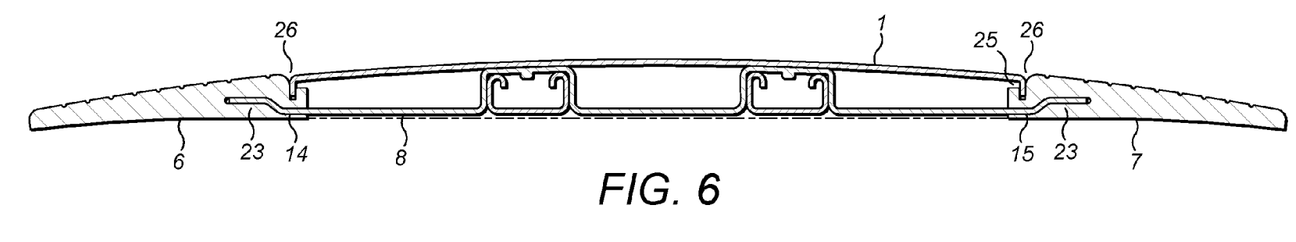
FIG. 6 shows a cross section through a partially assembled floor protector.

FIG. 6 shows a side view of an assembled floor protector.

This shows the two ramps 6 and 7 mounted respectively at the leading and trailing edges of a floor plate 1. Lips 26 at these edges fit within grooves or slots 25 of the ramps. The floor plate 1 is mounted above the base plate 8. Base plate 8 is also mounted to the ramps by virtue of its end lips 14 and 15 extending into the grooves 23 of the ramps. Note that the lips need not necessarily be S shaped and could simply extend part of the way into the grooves. They may be straight for example. The base plate 8 is therefore, secured within the ramps and, as shown by dot dash line 30, is spaced a small distance above the floor (when the floor is considered to be flat). If the floor is uneven then some parts of the floor may inadvertently contact the base but in general, at least a major part of the base will be clear of the floor. This helps to prevent damage of the floor.

Figure 7:
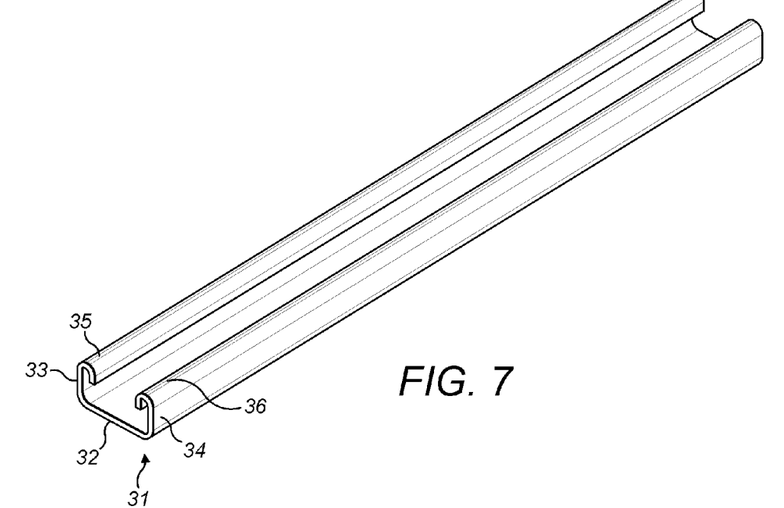
FIG. 7 is a deep channel elongate member.

As described above, jack screws may also be used to adjust the height and ensure the base is clear of the floor. Deep channel elongate members such as those known as Unistruts® (one example of which is shown in FIG. 7) may be mounted within the ribs 10, 11 formed by castellating the base for example. As shown in FIG. 7, each of these members is generally C shaped in cross section with the opening towards the top and each channel elongate member 31 comprise an elongate base 32, two side walls 33, 34 extending from opposing sides of the base, and inwardly directed distal parts 35, 36 of the side walls which extend inwardly and then downwardly towards the base at their ends. In order to allow for the off-set holes 12 and 13, deep channel members of different sizes may be used. Thus where a plurality of lanes are used the lanes may be partially connected by a deep channel member extending between them. A member 31 will be inserted from the side into a respective reinforced portion 10 to a position generally in the vicinity of one of the holes 12 or 13. A further member may then be inserted from the other side of the rib, again to the general vicinity of the hole 12 but a space left between the adjacent ends of the members, allowing for cabling to be taken out between them. Thus, elongate members of different lengths may be used for example.

Figure 8:
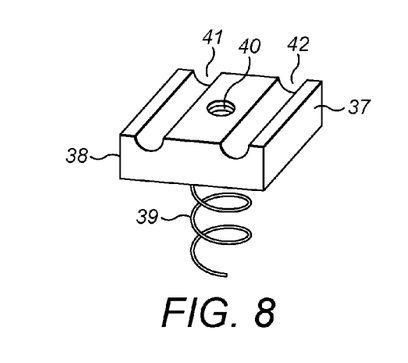
FIG. 8 shows a long spring channel nut.
Figure 9:
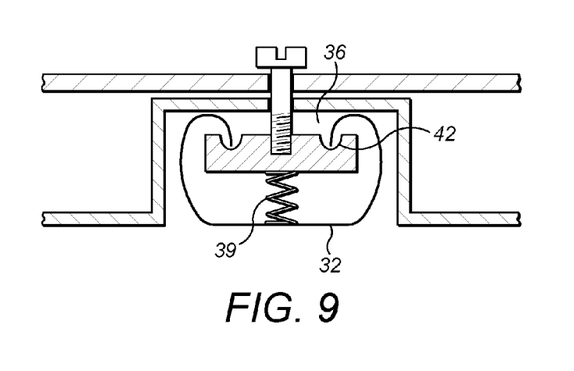
FIG. 9 shows a method of assembly.

The deep channel elongate members may then be used to fasten the floor plate to the base plate. For this, it is convenient to use one or more long spring channel nuts N, as shown in FIG. 8. These are otherwise sometimes known as zebedees. Each of these comprises a plate 38 which is generally rectangular or square shaped and a spring 39 which extends from the bottom surface of the plate. The plate includes a threaded hole 40 at its centre extending a depth into the plate or possibly a through-hole and two grooves 41, 42, extending generally longitudinally either side of the hole 40. In use, once a channel elongate member 31 has been inserted into a rib, or before such insertion, one or more long spring channel nuts 38 are located within the channel formed by the C section of the member 31. The plate 38 is of sufficient width that the grooves 42 are retained by the ends 35, 36 of the channel elongate member, as shown in FIG. 9. If the natural length of spring 39 is sufficiently long, then in order to place the long spring channel nut into position, the spring will need to be compressed in order for the nut to be held between end 36 and base 32. This causes upward pressure to be inserted by the nut. The nut is positioned within the channel elongate member at a position where when the floor 1 is placed above this, a suitable hole in the floor 1 lies in alignment with a hole in rib 10 and, therefore, a bolt or other means 43 can be applied within these holes and into the hole 40 of the long spring channel nut. Tightening of this causes the mechanism to be tightened together and, therefore, clearly securely affixes assembly, affixing the floor to the rib of the base plate and the reinforcing deep channel elongate member. The compression of spring 39 helps to create a rigid and secure connection. The nuts 37 need not necessarily include grooves 41, 42. They may be simply flat, or other shape, but of sufficient width to be retained by distal ends 35, 36.

Other means for connecting may be used but the mechanism shown is particularly advantageous since the long spring channel nut can be relatively freely moved along the channel of member 32 to a desired position before assembly and provides for a secure and rigid assembly.

Figure 10:
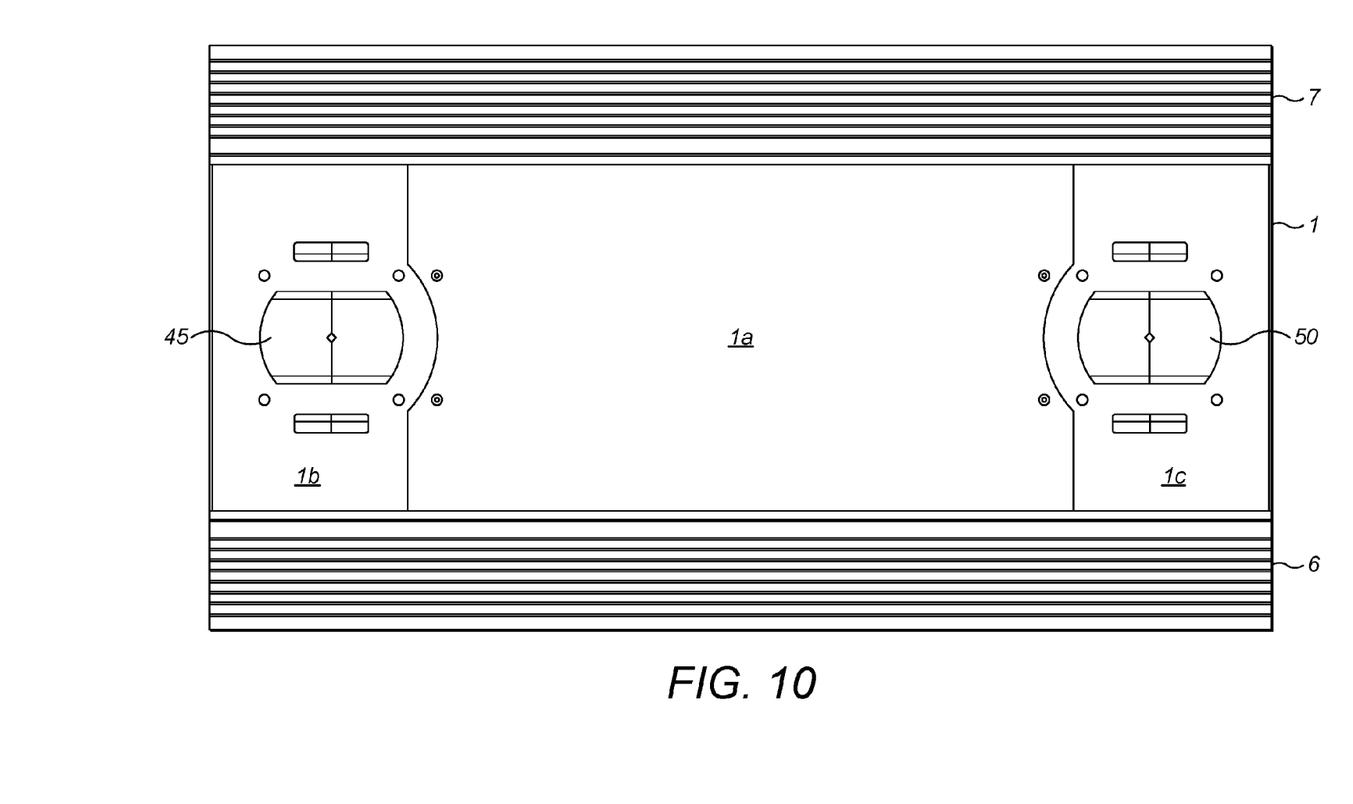
FIG. 10 shows a partial plan view.

FIG. 10 shows a plan view of a protector without the access control equipment in place, showing recess 45 and 50 in side parts (1b, 1c) of the plate upon which the access control mechanism may be mounted. As shown, the floor comprises a central part 1a which does not mount the access control equipment and, therefore, can be removed for maintenance or for moving or adding cabling, and two side floor parts 1b and 1c which do provide mounting for the housing for the access control equipment.

In one aspect, the invention may provide a floor protector for a security access system, comprising a rigid floor means comprising at least one floor plate and a base mounted underneath the floor plate, the base being at least partially spaced from the floor means enabling cabling to pass between the two, and elastomeric entry and exit ramps supporting the leading trailing (front and rear) of the floor assembly. The floor assembly may be supported by the ramps in such a manner that the whole or a major part of the floor assembly is clear of a floor which it overlies.

The invention claimed is:

1. A floor protector for a security access system, comprising a rigid floor assembly having front and rear edges, the floor assembly comprising at least one floor plate and a base mounted underneath the floor plate, the base being at least partially spaced from the floor plate enabling cabling to pass between the two, and elastomeric entry and exit ramps supporting the front and rear edges of the floor assembly; wherein the base has protrusions at its front and rear edges which locate within respective grooves in respective said elastomeric ramps, spaced a distance above the lower surface of the ramp, so as to support the base spaced above the whole or a major part of the floor that it overlies, and wherein each ramp comprises a narrow end and a wider end and a groove at the wider end extending inwardly into the ramp toward the narrow end and having a substantially "S" shaped cross section, and the base includes an outward protrusion at its front and/or rear edge having a corresponding shape for fitting within the groove in the ramp.

2. A floor protector as claimed in claim 1 wherein the base comprises one or more ribs and the floor plate is connected to the base at said ribs.

3. A floor protector as claimed in claim 1 wherein the ramps are formed of rubber or a rubber compound.

4. A floor protector as claimed in claim 1 wherein at least one of the ramps has an arcuate base which curves towards a floor that it overlies in a rest state.

5. A floor protector as claimed in claim 1 wherein the base is castellated to form reinforcing ribs extending in a transverse direction.

6. A floor protector as claimed in claim 1 wherein the base includes one or more reinforcing ribs formed in a direction which is transverse relative to a longitudinal direction between the front and rear edges of the floor assembly, and is connected to the floor plate by means of one or more deep channel elongate members mounted within each rib and one or more fasteners securing together the floor plate, the base and the deep channel elongate member.

7. A floor protector as claimed in claim 6 wherein the deep channel elongate member is substantially "C" shaped in cross-section, having respective ends that in cross section are directed, at least partially, towards each other, and a fastener comprising a plate of width sufficient to fit in the channel formed by the member and to be retained by a distal end of the deep channel elongate member, and a spring for acting under compression between the base of the floor assembly and a floor part of the deep channel elongate member.

8. A floor protector as claimed in claim 7 wherein the fastener is a long spring channel nut having a plate including two grooves on its top section, the distal ends of the channel elongate member fitting within the grooves.

9. A floor protector as claimed in claim 1 wherein the base includes two or more ribs extending in a direction which is transverse relative to a longitudinal direction between the front and rear edges of the floor assembly, each rib being formed with at least one orifice on a side edge, at least two of the orifices being transversely offset from one another.

10. A floor protector as claimed in claim 1 including one or more jacking screws applied through the base to a floor that the base overlies.

11. A floor protector as claimed in claim 10 wherein the jacking screws are of a plastic material.

12. A floor protector as claimed in claim 10 wherein the base is formed with at least one pre-formed hole for receiving one or more jacking screws.

13. A floor protector as claimed in claim 1 wherein the floor plate comprises at least two parts, the base and a housing of a security access system being connected to one of the parts and the remaining part being substantially unconnected to the base and housing for removability.

14. A floor protector for a security access system, comprising
a rigid floor assembly having front and rear edges, the floor assembly comprising at least one floor plate and a base mounted underneath the floor plate, the base being at least partially spaced from the floor plate enabling cabling to pass between the two, and
elastomeric entry and exit ramps supporting the front and rear edges of the floor assembly;
wherein the base has protrusions at its front and rear edges which locate within respective grooves in respective said elastomeric ramps, spaced a distance above the lower surface of the ramp, so as to support the base spaced above the whole or a major part of the floor that it overlies, and wherein the base includes one or more reinforcing ribs formed in a direction which is transverse relative to a longitudinal direction between the front and rear edges of the floor assembly, and is connected to the floor plate by means of one or more deep channel elongate members mounted within each rib and one or more fasteners securing together the floor plate, the base and the deep channel elongate member.

15. A floor protector as claimed in claim 14 wherein the deep channel elongate member is substantially "C" shaped in cross-section, having respective ends that in cross section are directed, at least partially, towards each other, and a fastener comprising a plate of width sufficient to fit in the channel formed by the member and to be retained by a distal end of the deep channel elongate member, and a spring for acting under compression between the base of the floor assembly and a floor part of the deep channel elongate member.

16. A floor protector as claimed in claim 15 wherein the fastener is a long spring channel nut having a plate including two grooves on its top section, the distal ends of the channel elongate member fitting within the grooves.

17. A floor protector as claimed in claim 14 wherein the base includes two or more ribs extending in a direction which is transverse relative to a longitudinal direction between the front and rear edges of the floor assembly, each rib being formed with at least one orifice on a side edge, at least two of the orifices being transversely offset from one another.

* * * * *